INVENTORS
Julian J. Keenan
Sten A. Lilja
Charles B. Kramos

AGENT

Sept. 9, 1969  J. J. KEENAN ET AL  3,465,419
METHOD OF MAKING DECORATIVE METAL STOCK
Filed May 22, 1964  2 Sheets-Sheet 2

INVENTORS
Julian J. Keenan
Sten A. Lilja
BY Charles B. Kramos

John G. Kovalich
AGENT

United States Patent Office 3,465,419
Patented Sept. 9, 1969

3,465,419
METHOD OF MAKING DECORATIVE
METAL STOCK
Julian J. Keenan, Short Hills, N.J., Sten A. Lilja, North Attleboro, Mass., and Charles B. Kramos, Barrington, R.I., assignors to Engelhard Industries, Inc., Newark, N.J., a corporation of Delaware
Filed May 22, 1964, Ser. No. 369,374
Int. Cl. B23k 31/02
U.S. Cl. 29—481                              3 Claims The present invention deals with a method of making decorative metal stock and more particularly with a method of making a decorative metal stock material having a multi-colored surface design.

In accordance with the invention, it has been discovered that it is possible to provide a decorative jewelry stock having a multi-colored surface design by a simple and expedient method of providing a bonded laminated stock of metal layers, at least one of which has a contrasting color relative to another layer, selectively recessing certain area portions of the stock, exposing portions of at least a first intermediate layer of the laminated stock through a surface and, thereafter, plastically deforming the layers into a surface composed of contrasting colored metal.

It is an object of the invention to provide a decorative metal stock for jewelry purposes.

It is another object of the invention to provide a decorative jewelry stock material having a multi-colored surface design.

It is a further object of the invention to provide a method for producing a decorative metal strip stock, sheet stock, tubing and wire material having a multi-colored surface design.

Figure 1:
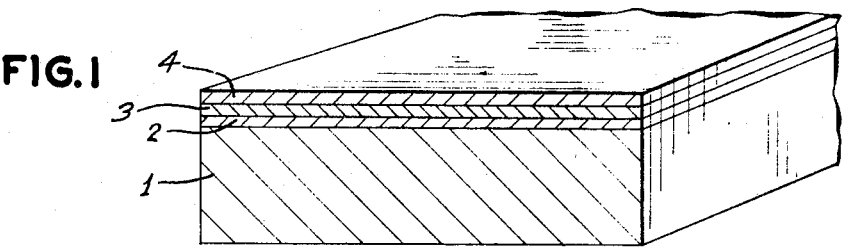
Figure 2:
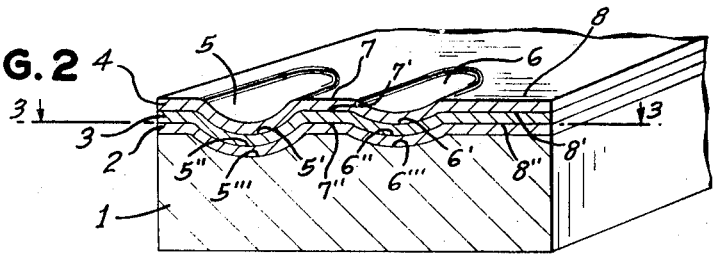
Figure 3:
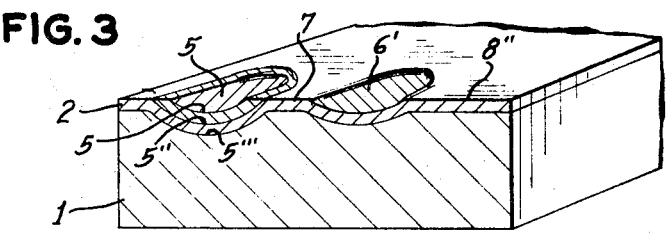
Figure 4:
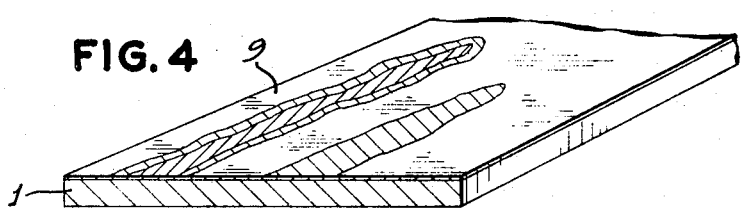
Figure 5:
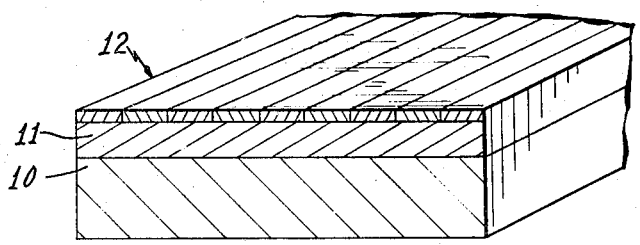
Figure 6:
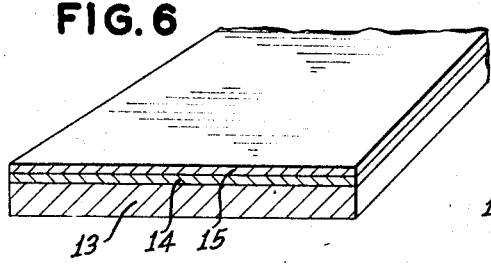
Figure 7:
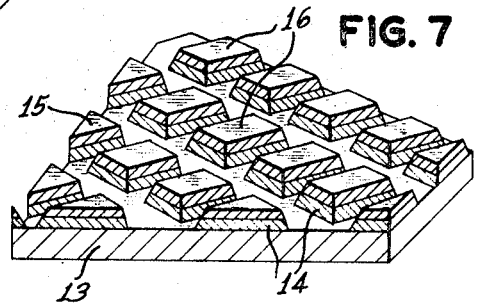
Figure 8:
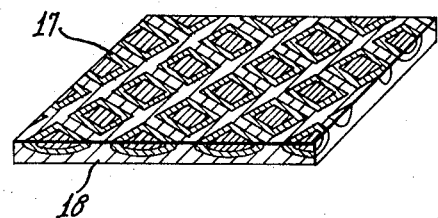
Figure 9:
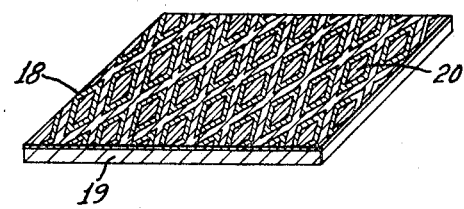
Figure 10:
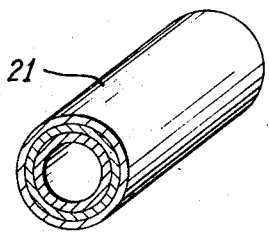
Figure 11:
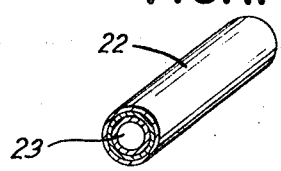

Other objects and advantages of the invention will become apparent from the description hereinafter following and the drawings forming a part hereof, in which:

FIGURE 1 illustrates an isometric cross-sectional view of a first-stage laminated metal stock, including a base, according to the invention, FIGURE 2 illustrates an isometric cross-sectional view showing a dimpling of the metal stock of FIGURE 1 from a surface layer into at least one covered layer of the lamination, FIGURE 3 illustrates an isometric cross-sectional view of a laminated stock showing a surface along lines 3—3 of FIGURE 2 removed therefrom, FIGURE 4 illustrates an isometric cross-sectional view showing the finished stock according to the invention, FIGURE 5 illustrates an isometric cross-sectional view of a laminated stock, including a base, having a surface layer composed of contrasting colored metal strips laid edge to edge, FIGURE 6 illustrates an isometric cross-sectional view of a laminated stock cladding material according to the invention, FIGURE 7 illustrates an isometric cross-sectional view showing a raised surface provided by the removal of portions of a surface layer and at least one covered layer of the stock illustrated in FIGURE 6, FIGURE 8 illustrates an isometric cross-sectional view of a laminated stock showing the raised layers of FIGURE 7 plastically deformed into a surface composed of metals of the composite raised portions, FIGURE 9 illustrates an isometric cross-sectional view of the laminated stock of FIGURE 8 clad onto a base and reduced, FIGURE 10 illustrates an isometric cross-sectional view of a tubing formed from the laminated stock of FIGURES 4 and 9, and FIGURE 11 illustrates an isometric cross-sectional view of a wire formed from the tubing of FIGURE 1 with a core positioned therein.

In accordance with the invention, FIGURE 1 illustrates a composite stock material or a laminated stock material comprising a plurality of metal layers including a metal base 1 composed, for example, of copper or copper alloy or nickel or nickel alloy or any appropriate base metal or alloy thereof clad with a plurality of metal layers 2, 3 and 4 at least one layer of which has a contrasting color relative to another layer. The layers of the laminated stock are superposed on one another and bonded together by known bonding techniques such as soldering or welding to provide a first stage laminated stock. The composite cladding layers of the stock may comprise alternate layers of copper, nickel, and brass providing the alternate colors red, white and yellow, or the alternate layers may comprise gold layers of contrasting colors relative to each other such as red gold, green gold, yellow gold, etc. or a combination of both precious metals and base metals.

Regarding FIGURE 2, the second stage of the method of the invention comprises recessing certain selective area portions of the surface layer 4 of the laminated cladding to either variable comparative depths relative to one another as illustrated by recesses 5 and 6, or to equal depths, and to a degree sufficient to provide substantially similar modified recesses 5' and 6' in at least the first intermediate layer or also depressions 5" and 6" in the second intermediate layer 2, or also depressions 5''' and 6''' in the clad surface of the base 1 as well. It is apparent that the recessing provides attendant raised area portions 7, 7', 7" and 8, 8', and 8" as well as the recessed areas.

FIGURE 3 illustrates a laminated stock provided by exposing the laminar portions of the second intermediate layer 2 of FIGURE 2 adjacent the recessed area portions of the stock. When a greater number of laminataed layers to provide a greater variety of color are desired, portions of the innermost layer bonded to the base which are adjacent the recessed area portions of the stock are exposed. The innermost layer 2 may be exposed by milling, sanding or grinding the surface of the recessed stock to a depth as illustrated by lines 3—3 of FIGURE 2 thereby retaining the recessed metal of layers 3 and 4 in the layer 2. Having provided the recessed laminated of FIGURE 2, the stock is thereafter further finished, if desired, as by rolling or compression whereby the layers are plastically deformed into a substantially flat cladding surface containing the blended metals of the layers and the plastically deformed surface of the cladding metal as illustrated by FIGURE 4, is provided with a surface 9 of variegated colors.

FIGURE 5 illustrates a modification of the first stage laminated stock of FIGURE 1, whereby the composite or laminated stock comprises a base 10, an intermediate layer 11 and a surface layer 12 comprising alternate strips of contrasting colored metal laid edge to edge. Otherwise the method steps are identical with those described in connection with FIGURES 1 through 4 for provision of a cladding surface of variegated color.

FIGURE 6 illustrates a modification of the invention showing a laminated stock material having a plurality of metal layers 13, 14 and 15 of contrasting color superposed one on another and with the metal base omitted to provide a first stage metal stock.

FIGURE 7 illustrates a second stage of the method comprising recessing certain selective area portions of the laminated cladding stock of FIGURE 6 to substantially equal depths through at least the surface layer 15, e.g. through the surface layer 15 and the intermediate layer 14 by machinery, drilling or grinding thereby grooving the layers and exposing portions of the layers in the form of geometric raised sections 16 spaced from each other, the geometric sections each composed of portions of the surface layer and the intermediate layer. As a third stage, according to FIGURE 8, the recessed or grooved laminated stock material is rolled or compressed to plastically deform the metal layers into a substantially flat decorative surface 17, whereby the grooves are filled by plastic deformations of the composite layer metals providing a layer 18 having a blended geometric pattern of contrasting colors on the surface 17.

Regarding FIGURE 9, the plastically deformed layer 18 is bonded to a surface of a metal base 19 and the composite is further reduced to provide a still further modified decorative surface layer 20 produced by the further reduction.

Having provided the finished clad material of FIGURES 4 or 9, or even the clad or cladding material illustrated by FIGURES 3 and 7 showing the composite material prior to the plastic deformation stage, the sheet or strip may be formed by a die according to known procedure into a tubing 21 having a decorative surface (not illustrated) corresponding to FIGURES 3 and 7.

In order to provide a wire 22 according to FIGURE 11 and having a decorative surface (not shown) the tubing 21 of FIGURE 10 may be provided with a core 23 and drawn to wire dimensions.

Various modifications are contemplated within the scope of the appended claims.

What is claimed is:

1. The method of making a cladding material having a decorative surface, comprising laminating and bonding a plurality of metal layers of contrasting color relative to each other to provide a composite stock material wherein alternate layers of the composite stock material are each composed of a metal contrasting in color relative to another layer, recessing selective area portions of a surface layer to variable depths one relative to another and continuing the recessing into at least one intermediate layer, exposing portions of at least the said intermediate layer by removal of laminar portions of at least the surface layer and the said intermediate layer, and plastically deforming the composite material to blend the layers of the composite material after removal of the laminar portions into a material having a substantially flat surface comprising blended metals of said layers in a variegated color design.

2. The method of claim 1, comprising bonding the cladding stock material to a metal base prior to recessing the cladding material to provide a clad stock material.

3. The method according to claim 1 wherein the surface layer is formed by bonding a plurality of metal strips, one contrasting in color to another, in edge to edge relationship onto the surrface of an intermediate layer.

References Cited
UNITED STATES PATENTS

| | | | |
|---|---|---|---|
| 374,097 | 11/1887 | Wall | 29—480 |
| 427,924 | 5/1890 | Smith | 29—497.5 X |
| 450,412 | 4/1891 | Knight | 29—199 X |
| 1,586,927 | 6/1926 | Wilkinson et al. | 29—199 X |
| 3,153,278 | 10/1964 | Martin et al. | 29—197.5 X |
| 3,165,824 | 1/1965 | Barney | 29—160.6 X |
| 3,165,825 | 1/1965 | Barney | 29—160.6 X |

JOHN F. CAMPBELL, Primary Examiner

J. L. CLINE, Assistant Examiner